United States Patent [19]

Utke et al.

[11] Patent Number: 5,446,701
[45] Date of Patent: Aug. 29, 1995

[54] OBJECT LOCATOR SYSTEM

[75] Inventors: Reinhold E. Utke; John L. Eidsness; Dale P. Van de Loo; Gary L. Ellingson, all of Moorhead, Minn.; Joel T. Aslakson, Fargo, N. Dak.

[73] Assignee: Teem Systems, Inc., Moorhead, Minn.

[21] Appl. No.: 104,813

[22] Filed: Aug. 10, 1993

Related U.S. Application Data

[62] Division of Ser. No. 937,477, Aug. 28, 1992, Pat. No. 5,346,120.

[51] Int. Cl.6 .................................................. G01S 3/80
[52] U.S. Cl. .................................. 367/118; 367/125; 367/127; 367/129; 367/128
[58] Field of Search ............... 367/118, 124, 125, 127, 367/129, 128

[56] References Cited

U.S. PATENT DOCUMENTS

| | | | |
|---|---|---|---|
| 3,518,674 | 6/1970 | Moorehead et al. | 343/112 |
| 3,739,329 | 6/1973 | Lester | 367/118 |
| 3,985,356 | 10/1976 | Carlock | 342/126 |
| 4,090,708 | 5/1978 | McPeak | 364/551.01 |
| 4,215,856 | 8/1980 | Schmall et al. | 367/127 |
| 4,247,922 | 1/1981 | Jackson et al. | 343/112 |
| 4,454,583 | 6/1984 | Schneiderhan et al. | 364/551.01 |
| 4,541,013 | 9/1985 | Alpert | 367/118 |
| 4,545,576 | 10/1985 | Harris | 367/127 |
| 4,647,969 | 3/1987 | Graham, Sr. | 367/127 |
| 4,675,816 | 6/1987 | Brandon et al. | 367/127 |
| 4,698,781 | 10/1987 | Cockerell, Jr. | 364/561 |
| 4,813,025 | 3/1989 | Rowland et al. | 364/561 |
| 4,822,042 | 4/1989 | Landsman | 364/561 |
| 4,833,480 | 5/1989 | Palmer et al. | 342/126 |
| 4,882,676 | 11/1989 | Van De Kop et al. | 367/127 |
| 4,924,450 | 5/1990 | Brashear et al. | 367/127 |
| 4,980,871 | 12/1990 | Sieber et al. | 367/127 |
| 5,039,977 | 8/1991 | Mele et al. | 343/112 |
| 5,056,106 | 10/1991 | Wang et al. | 367/118 |
| 5,082,263 | 1/1992 | Berger | 367/127 |
| 5,099,456 | 3/1992 | Wells | 367/127 |
| 5,138,322 | 8/1992 | Nuttal | 342/126 |
| 5,142,506 | 8/1992 | Edwards | 367/127 |
| 5,214,491 | 5/1993 | Snowden | 367/127 |
| 5,270,950 | 12/1993 | Cowley et al. | 364/551.01 |
| 5,339,281 | 8/1994 | Narendra et al. | 367/5 |
| 5,359,575 | 10/1994 | Williams et al. | 367/127 |

FOREIGN PATENT DOCUMENTS

| | | |
|---|---|---|
| 387662B | 2/1989 | Austria . |
| 0006594 | 6/1979 | European Pat. Off. . |
| 2654945 | 5/1991 | France . |
| 2250154 | 5/1992 | United Kingdom . |

OTHER PUBLICATIONS

European Search Report from EPO dated Jun. 28, 1994.

Primary Examiner—J. Woodrow Eldred
Attorney, Agent, or Firm—Harness, Dickey & Pierce

[57] ABSTRACT

An object locating system, especially for use in locating a gaming ball in the game of football, utilizes a series of three sensors positioned on one side of a football playing field and a calibration source positioned on the other side. The calibration source emits an ultrasonic signal which is received by the sensors in order to provide a calibration signal. A ball marking unit is positionable on the field at a location of the ball and emits an ultrasonic signal which is received by the sensors and an RF signal which is received by the calibration source in order to turn the calibration source off. The sensors provide signals in which a processing unit calculates time delays by a time acquisition process in order to determine the position of the ball. In an alternate embodiment, the ball marking unit emits only an RF signal which is received by the sensors. The sensors again provide signals which are analyzed by the processing unit to determine delay between receipt of the signals at the sensors. Additionally, an automatic ball marking unit on a track drive can be controlled by the processing unit to automatically provide a visual representation of the ball's location.

8 Claims, 8 Drawing Sheets

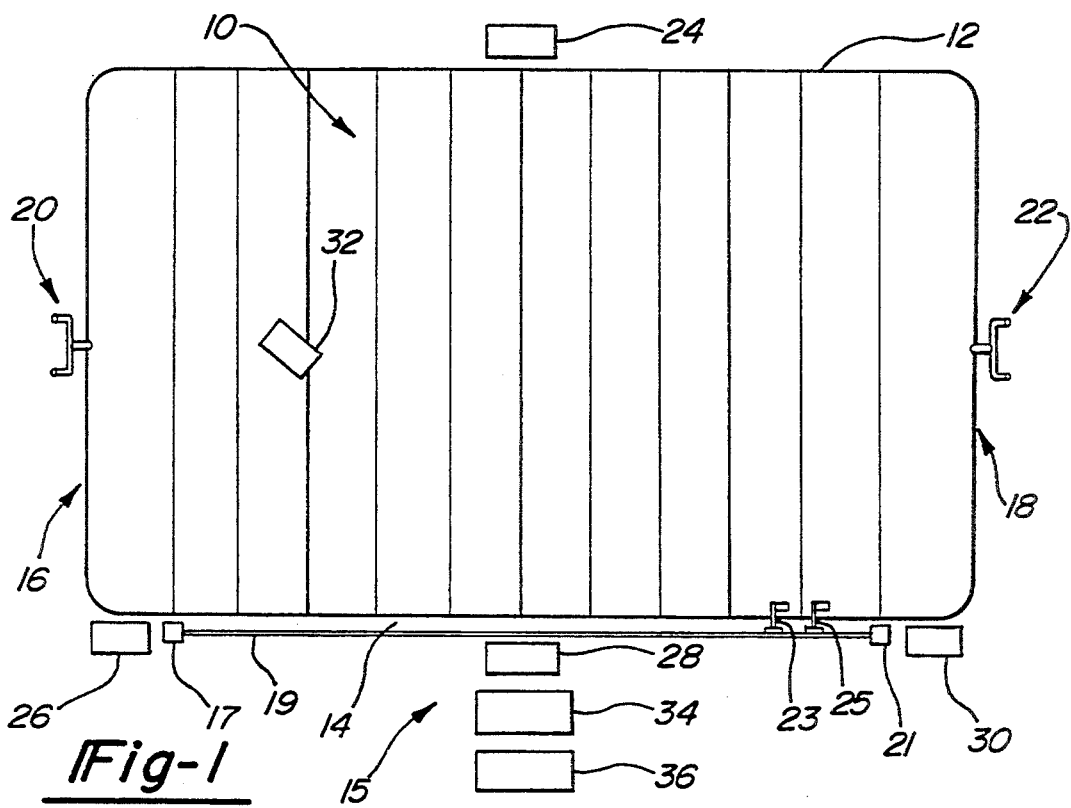
Fig-1
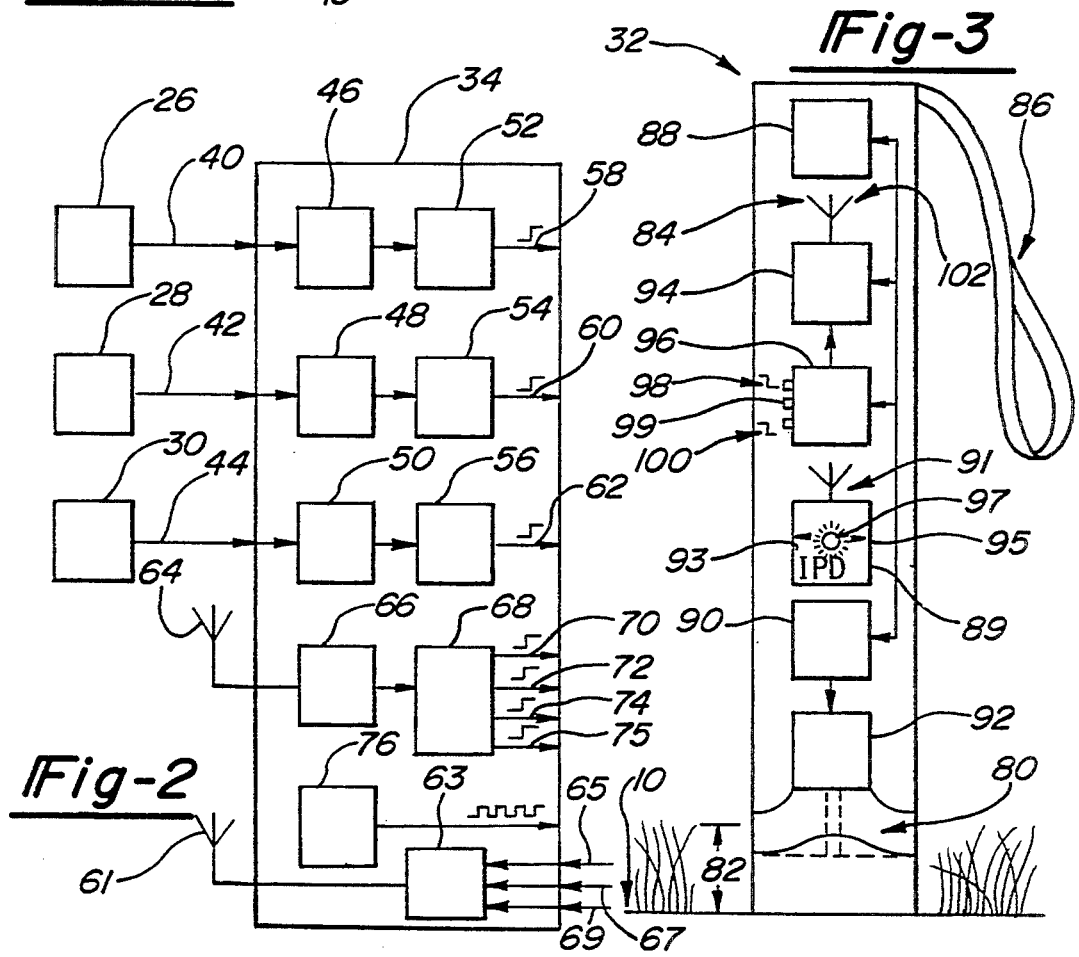
Fig-2
Fig-3

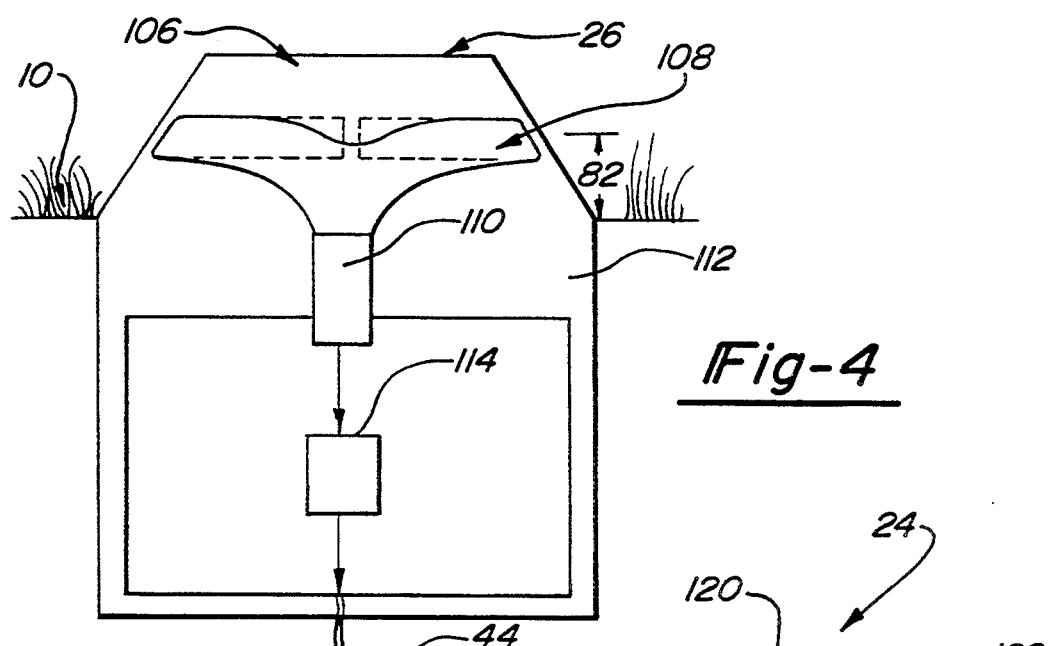
*Fig-4*
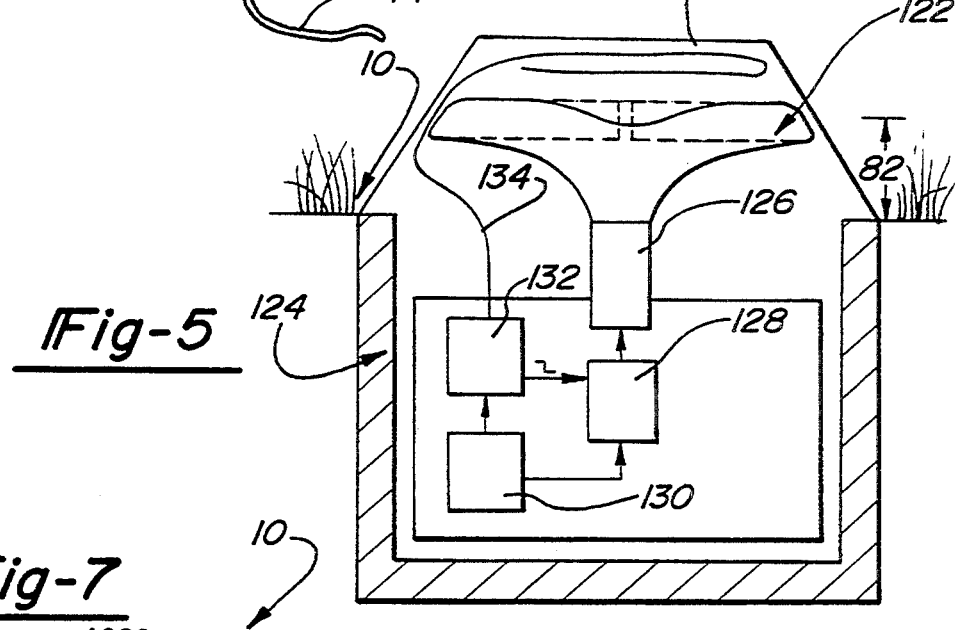
*Fig-5*
*Fig-7*
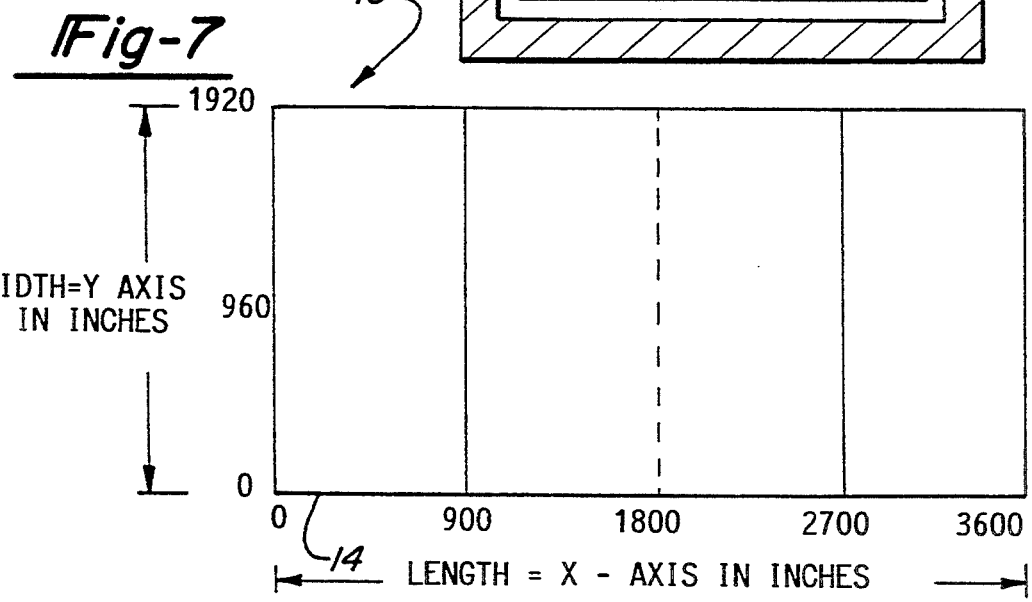

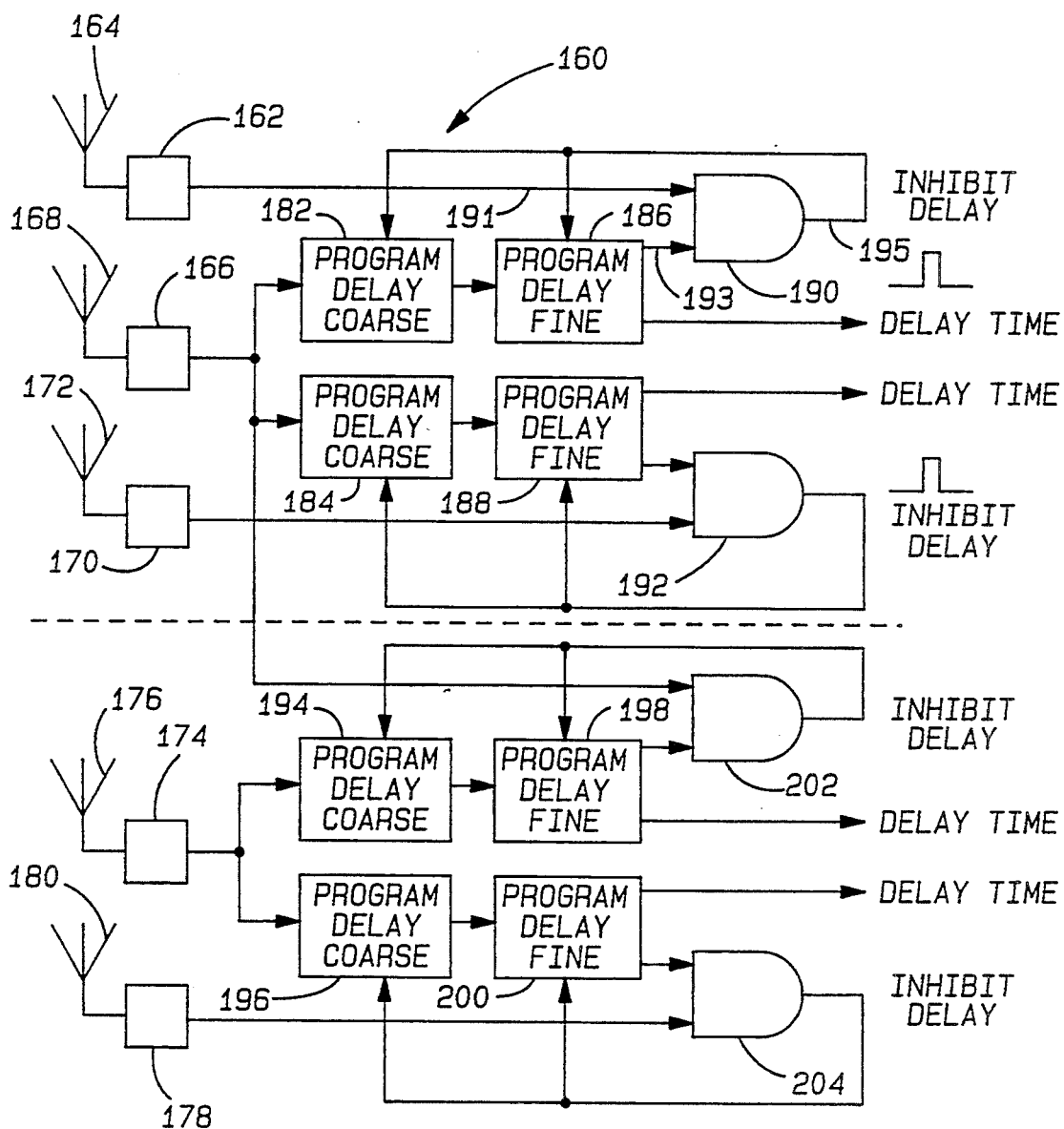
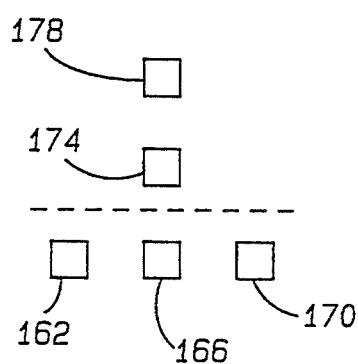
Fig-6a
Fig-6b

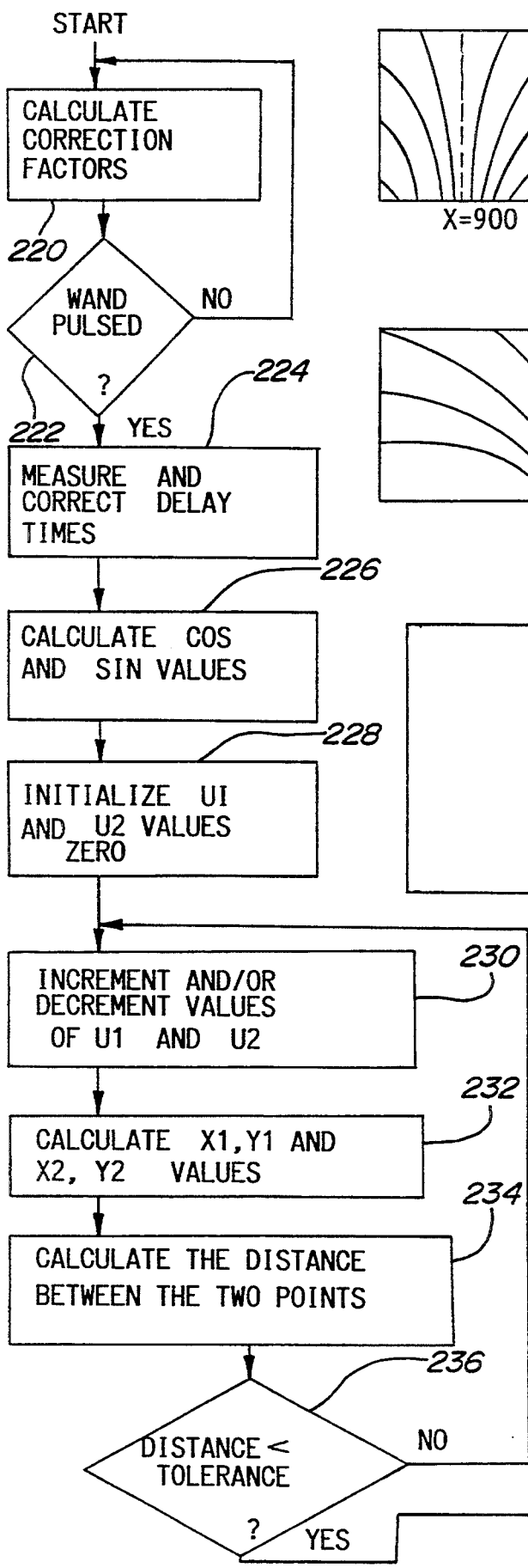
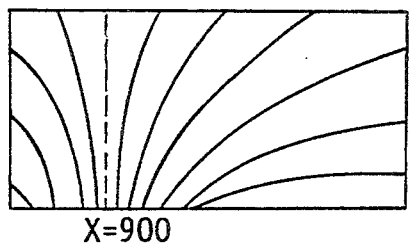
*Fig-8A*
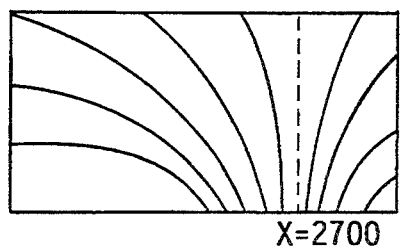
*Fig-8B*
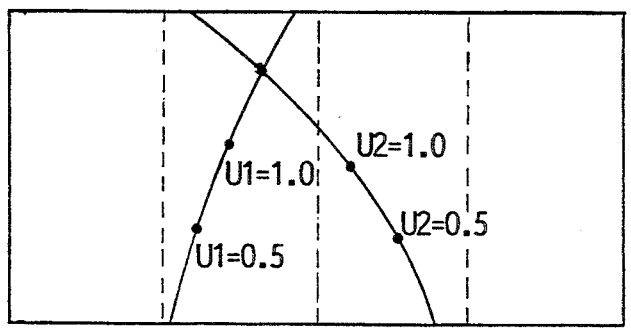
*Fig-9*
*Fig-10A*

OBJECT LOCATOR SYSTEM

This is a division of U.S. patent application Ser. No. 937,477, filed Aug. 28, 1992 now U.S. Pat. No. 5,346,120.

BACKGROUND OF THE INVENTION

1. Field of the Invention

This invention relates generally to systems for locating an object and, more particularly, to systems for determining the position of a gaming ball relative to a playing field by use of radio frequency and ultrasonic transmitters and receivers.

2. Discussion of the Related Art

In certain games incorporating gaming balls, it is generally crucial to the fairness of the game that the location of the gaming ball be reasonably accurately determined relative to a playing field. Typically, multiple gaming officials are utilized for determining the ball's location, and thus, a certain amount of subjectivity is interjected into the game which may result in substantial mistakes due to human nature possibly affecting the fairness of the play. With particular reference to football, it is necessary to determine the location of the football so as to enable the officials to accurately monitor "first down" situations, as well as, repositioning the football relative to a previous location. Additionally, the speed at which the game is played may be substantially affected by how quickly the gaming ball can be accurately located. Furthermore, the number of gaming officials necessary to officiate the game may also be substantially dependent on the ability of the officials to accurately determine the ball location. Therefore, different methods have been employed to at least assist the gaming officials in determining the location of the gaming ball.

Current technology has seen the use of instant-replay video equipment utilized for immediate reevaluation of close game play. This method, however, requires the interaction between gaming officials and broadcast technicians and involves the use of expensive cameras and video equipment not normally available at most sporting events. Additionally, stop-action photography equipment has been used to record photo-finish events. This method, while providing a permanent record, introduces additional time delay into the particular sporting event unless used in conjunction with instant replay video equipment, and therefore, would be subject to the same disadvantages as mentioned above. Further, photosensitive devices have been installed at appropriate locations which are triggered when a gaming ball or other apparatus or player crosses marked boundaries. This method is, however, restricted to boundary locations and does not address the game ball's location during the vast majority of play when the ball is at random locations and not at or crossing a boundary. Also, buried wires have been placed on field boundaries to magnetically detect a modified game ball as it passes over marked boundaries. This method, similar to the photosensitive devices described above, also requires modification of the gaming ball or other apparatus restricting the use of commonly available sporting devices and subjecting the devices to the rigors of the game.

The use of ultrasonic devices to measure distances is known. Ultrasonic measurement is, however, generally dependent upon consistent transducer coupling to the surrounding environment and the relative stability of that environment. Inconsistent results occur because ultrasonic waves will change under different environmental conditions as the sound waves pass through various media. Furthermore, playing field conditions could dynamically change over the playing season as a result of climatic variances, and even change during a single game itself due to player activity or changes in weather. Because playing field conditions can vary greatly, successful coupling of the transducers to the environment would be difficult to consistently achieve. In order to accommodate these environmental changes, sophisticated calibration methods of guaranteeing continued accuracy would have to be employed, thus increasing the cost and complexity of the system and sending the system beyond the reach of the resources of average schools and athletic departments. Consequently, the use of ultrasonics in ball locator systems has heretofore been limited.

Because of the limitations of sound waves as just discussed, it has been known to use radio frequency systems as gaming ball locators. Since radio frequency waves travel at very high speeds, environmental conditions have little effect on the wave propagation. One prior art football locating system using radio frequency waves is disclosed in U.S. Pat. No. 4,675,816 issued to Brandon, et al. That patent discloses a ball locator system in which a gaming official positions a radio transmitter at the football's location and then energizes the transmitter to send a radio signal to a series of rotating antennas positioned at predetermined locations relative to the playing field. The antennas "home" in on the transmitted signal and through the use of triangulation principles, the position of the football is determined relative to the playing field.

The above described radio frequency ball locator, as well as other radio frequency ball locators, suffer from a number of limitations and drawbacks. Because of the relatively small area of the playing field in comparison to the speed of the signal, the accuracy obtainable by the system would be limited due to the effective beam width of the radio frequency signal. In other words, because a greater portion of the beam width would be of a sufficient magnitude for the antennas to home in on, a certain degree of unacceptable tolerance would induce sufficient errors in the calculations. Additionally, because the antennas are rotating, the radiation source must be on for a sufficient time to allow the antennas to be positioned in the desirable orientation. This places a fairly high demand on the antenna positioning system.

What is needed then is an object locating system which can be used for locating a gaming ball and which in one application utilizes the slow speed of sound waves, but does not suffer the environmental drawbacks associated with the prior art devices, or in an alternate application utilizes radio frequency technology in an effective manner. It is therefore an object of the present invention to provide these systems.

SUMMARY OF THE INVENTION

This invention discloses object locator systems having a particular use for locating a gaming ball relative to a playing field. In one preferred ultrasonic embodiment, a locating system includes a calibration source on one side of the playing field, a number of sensing modules on an opposite side of the field, and a portable ultrasonic ball marking unit positionable on the field at the ball's location. The calibration source includes an ultrasonic transducer for emitting an ultrasonic sound wave at a particular sonic frequency and a radio frequency receiving circuit for receiving a radio frequency signal. The portable ball marking unit includes an ultrasonic transducer for emitting an ultrasonic sound wave at substantially the same frequency as the calibration source and a radio frequency source for emitting a radio frequency signal for switching the calibration source off during ball marking procedures. The sensing modules include ultrasonic receivers for receiving the ultrasonic signals from both the calibration source and the ball marking unit. A processing unit processes the signals sensed by the module sensors.

In operation, the calibration source continuously emits an ultrasonic signal which is received by the sensor modules. The sensing modules in turn convert the ultrasonic signal to proportionate electrical signals and send the electrical signals to the processing unit. A time delay is administered to the electrical signals such that the processing unit perceives the ultrasonic signal to have been received by a reference sensor first such that the signals received by the other sensors are referenced relative to the reference sensor. Each of the electrical signals from the sensing modules are processed by the processing unit to measure their relative time difference in order to calibrate the system to the instantaneous environmental conditions.

When a gaming official wishes to determine the ball's location, he places the ball marking unit at the location of the ball and activates it. The ball marking unit then emits an ultrasonic frequency to the sensing modules and a radio frequency signal to the calibration source and the sensing modules. The radio frequency signal causes the calibration source to switch itself off such that the only ultrasonic signal that the sensing modules receive is from the ball marking unit. The processing unit receives the signals from the sensing modules and determines the ball marking unit's location through a delay time acquisition process, taking into consideration adjustments for environmental conditions as previously calculated by the signal from the calibration source.

In an alternate radio frequency (RF) embodiment, a number of RF receivers are positioned relative to the playing field. A portable ball marking unit is positionable on the field and when activated sends an RF signal to be received by each of the RF receivers. As above, a reference receiver always receives the RF signal first. The signal from the reference receiver is then applied to a series of programmable delay circuits which incrementally delay the received signal a predetermined amount. The delayed signal is separately compared to the signals from the other receivers in threshold logic circuits, and an output of the threshold logic circuits is applied to the programmable delay circuits for sending a signal indicative of when the signal from the reference receiver has been delayed enough to match in time the signals from the other receivers. When the delay times between the reference receiver and each of the other receivers have been determined, these delay times are compared by a processing unit to determine the position of the gaming ball by a delay time acquisition process. If desirable, a set of additional receivers can be incorporated in order to derive a vertical position of the object to be located.

The delay time acquisition process compares the different time delays in order to determine the position of the ball. The process maps the playing field into two sets of elliptical cylindrical coordinates centered midway between the location of the reference receiver and either of the other receivers. By determining along which coordinate ray of each coordinate system the received signal is being generated, and then tracing these coordinate rays out from the sideline position, it is possible to determine the convergence of the rays, and thus the location of the portable ball marking unit, which indicates the ball's location within a minimum tolerance.

The systems discussed above may include an automatic ball marker and first down marker fixed to a drive chain running the length of the field for providing a visual reference of the football location and the down. In this manner, the processing unit associated with the systems is connected to the driving devices which drive the chains connected to the first down marker and ball marker. Consequently, not only can the system determine the ball's position, but also can automatically provide a visual display of this location. Additional objects, advantages, and features of the present invention will become apparent from the following description and the appended claims, taken in conjunction with the accompanying drawings.

BRIEF DESCRIPTION OF THE DRAWINGS

FIG. 1 is an illustration of a playing field incorporating a ball locating system according to preferred embodiments of the present invention;

FIG. 2 is a signal processing unit which processes ultrasonic and radio frequency signals as a part of the ball locating system;

FIG. 3 is a portable ball marking unit according to a preferred embodiment of the present invention;

FIG. 4 is a sensing module according to a preferred embodiment of the present invention;

FIG. 5 is a calibration source according to a preferred embodiment of the present invention;

FIG. 6(a) is a schematic block diagram of an object locating system according to another preferred embodiment of the present invention;

FIG. 6(b) is a receiver position depiction of receivers of the system of FIG. 6(a);

FIG. 7 is a graphic representation of the playing field of FIG. 1;

FIGS. 8(a–8(b) are coordinate axes depictions of the playing field of FIG. 1;

FIG. 9 is a representation of a ray convergence process for locating a position relative to the playing field of FIG. 1;

DETAILED DESCRIPTION OF THE PREFERRED EMBODIMENTS

Figure 6C:
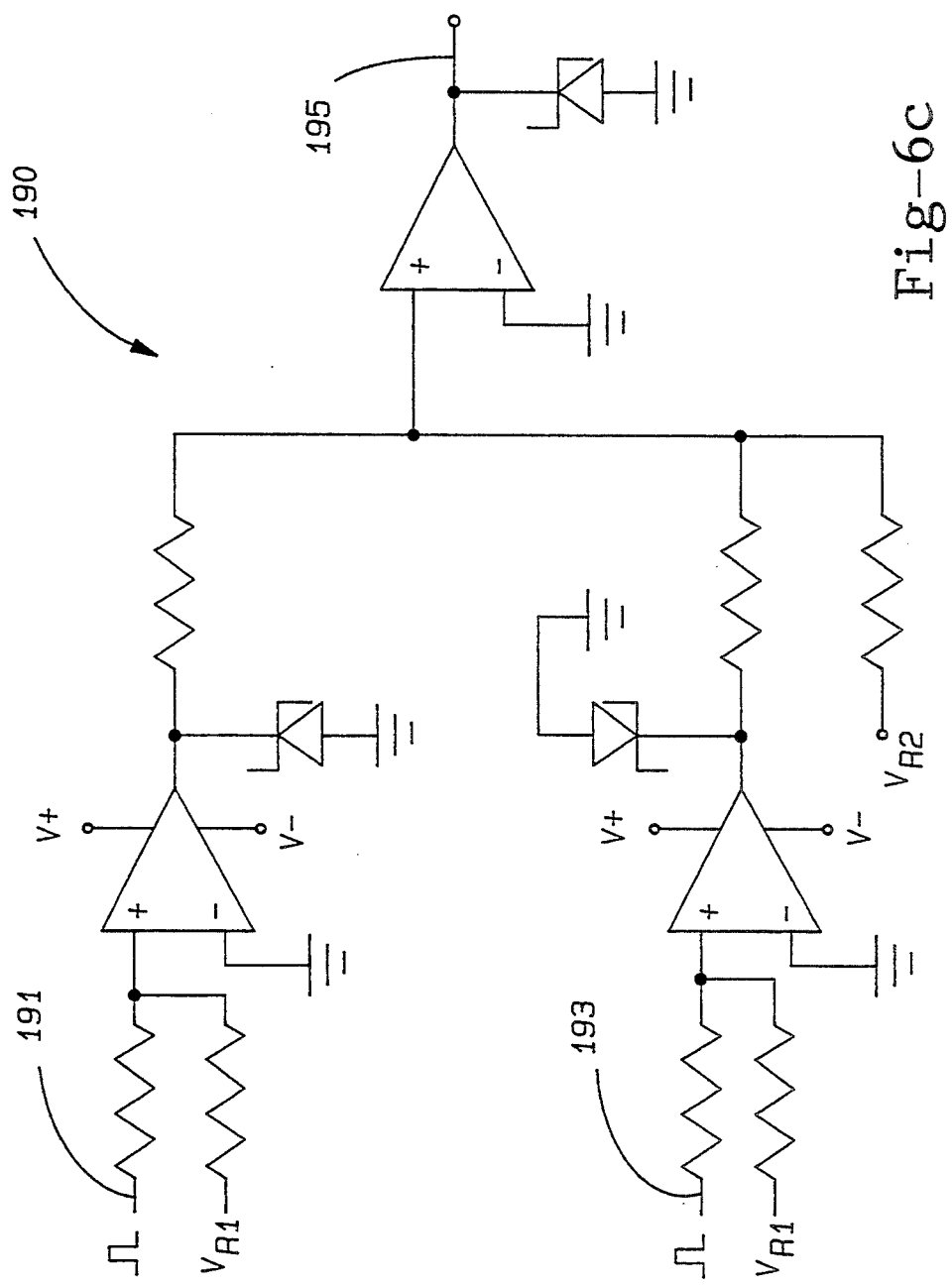
FIG. 6(c) is a circuit diagram of one of the threshold logic elements of FIG. 6(a)

The following discussion of the preferred embodiments concerning ball locating systems and procedures is merely exemplary in nature and is in no way intended to limit the invention or its application or uses.

The discussion of the locating systems of the present invention will be given with particular reference to the location of a football, but it should be understood that the system is adaptable to other games and sports, as well as other non-gaming applications such as security systems, geophysical services, military, and virtual reality, without departing from the spirit and scope of the invention.

With this in mind, first refer to FIG. 1 in which a football playing field 10 is shown. The playing field 10 includes a first side line 12, a second opposite side line 14, a first end zone region 16 and a second opposite end zone region 18. Further, a first goal post target 20 is shown relative to the end zone 16 and a second goal post 22 is shown relative to the end zone 18.

Incorporated in association with the playing field 10 is a ball marking system 15 for automatically providing a visible representation of the football's location and the appropriate down and first down distance. As will be discussed in greater detail below with particular reference to FIG. 11, the ball marking system 15 includes a first control unit 17 connected to one end of a segmented aluminum track drive 19 and a second control unit 21 connected to the opposite end of the track drive 19. A pair of drive chains traveling through the track drive 19 between the control units 17 and 21 position a ball marker 23 and a first down marker 25.

Also incorporated in association with the playing field 10 is a ball locating system according to one preferred embodiment of the present invention. The ball locating system includes a calibration source 24 positioned a predetermined distance from the side line 12 and three ultrasonic module sensors 26, 28 and 30 positioned at predetermined locations relative to the opposite side line 14, as shown. The calibration source 24 is operable to emit an ultrasonic frequency signal at a particular frequency $f_1$ and the sensing modules are operable to receive this signal, as will be discussed in greater detail below. Additionally, a ball marking unit 32 is positioned at a specific location on the playing field 10 relative to the position of a football (not shown) and is portable such that it can be moved to alternate locations on the field 10. The portable ball marking unit 32 is operable to transmit an ultrasonic frequency substantially at the same frequency $f_1$ as the calibration source 24 emits its ultrasonic frequency, and a radio frequency signal at a second frequency $f_2$ in order to instruct the calibration source 24 to discontinue emitting its signal. A signal processing unit 34 is incorporated to receive electrical signals from the module sensors 26, 28 and 30 and process these signals to produce delay signals. The delay signals are then sent to a central processing unit (CPU) 36 for performing time acquisition computations on the signals for determining the position of the football. Alternatively, the processing unit 34 and the CPU 36 can be a single device.

Turning to FIG. 2, each of the ultrasonic sensing modules 26, 28 and 30 is shown electrically connected to the signal processing unit 34 by means of a series of velocity-compensated coaxial cables 40, 42 and 44, respectively. As mentioned above, each of the sensing modules 26, 28 and 30 receives the ultrasonic signal $f_1$ whether it is coming from the calibration source 24 or the portable ball marking unit 32. Once the sensing modules 26, 28 and 30 convert the acoustical energy into electrical energy, they transfer the electrical signal to the processing unit 34 by the coaxial cables 40, 42 and 44. The application of the electrical signals to the coaxial cables 40, 42 and 44 is such that electrical signals from the modules 26 and 30 do not reach the processing unit 34 before the signal from the module 28. In this manner, the sensor module 28 acts as a reference module and it is the comparison of the difference between the delay time of the signal received at the module 26 and the module 28, and the delay time between the signal received at the module 30 and the module 28 which is analyzed to determine the ball's location.

In the processing unit 34, the coaxial cable 40 is electrically connected to a first limiter circuit 46, the coaxial cable 42 is electrically connected to a second limiter circuit 48, and the third coaxial cable 44 is electrically connected to a third limiter circuit 50 in order to filter the electrical signals and achieve greater noise immunity. The outputs from each of the limiter circuits 46, 48 and 50 are then applied to three separate threshold detection circuits 52, 54, and 56, respectively, as shown. The threshold detection circuits 52, 54, and 56 apply a minimum threshold comparison to the electrical signals from the sensing modules 26, 28 and 30 in order to provide a minimum signal level to reduce the probability of detecting false signals. The outputs from each of the threshold detection circuits 52, 54 and 56 are then applied to the central processing unit 36 as interrupt signals 58, 60 and 62, respectively. The CPU 36 measures the relative time difference between the difference of the signals received at the modules 26 and 28 and the difference of the signals received at the modules 30 and 28, and performs computations to determine the ball's position as will be discussed in greater detail below.

The signal processing unit 34 also receives the radio frequency $f_2$ from the portable ball marking unit 32 by an antenna 64 so that the processing unit 34 knows if it is receiving signals emitted by the calibration source 24 or the portable ball marking unit 32. The antenna 64 transmits the received radio frequency signal $f_2$ to an on-channel receiver 66. The output of the receiver 66 is applied to a demodulation circuit 68 to provide interrupt signal 70 indicating whether the ball marking unit 32 is active and, depending on which directional button (discussed below) was pressed on the ball marking unit 32, provides interrupt information on whether the game activities are directed toward the goal 20 or the goal 22 on output lines 72 and 74. Interrupt output 75 provides CPU 36 with an indication that ball marking unit 32 is in a relocate or reposition mode of operation, wherein the user is attempting to determine a previously calculated position of the ball. Additionally, the signal processing unit 34 includes an astable multivibrator 76 for generating a clocking frequency applied to the central processing unit 36 as a timing reference to be used with the locating method to be discussed below.

Signal processing unit 34 additionally includes rf signal generator 63 receiving signal generating inputs 65, 67 and 69 from CPU 36 and having a modulated output with carrier frequency $f_3$ coupled to radiating antenna 61. As will be explained in greater detail below, when a RELOCATE or REPOSITION switch on ball marking unit 32 is activated, CPU 36 enters a mode wherein a currently calculated position of unit 32 is compared to the last previously determined position of the ball. The location of unit 32 relative to the last ball location is then indicated to unit 32 via LEFT, RIGHT or IN-POSITION signals on leads 65, 67 and 69. Such signals are then transmitted to ball locator unit 32 via signal generator 63 and antenna 61.

Now turning to FIG. 3, the details of the portable ball marking unit 32 will be discussed. The portable ball marking unit 32 is shown positioned relative to the playing field 10 such that a tuned port 80 associated with the unit 32 is a known, desirable distance 82 above the surface of the playing field 10. The ball marking unit 32 includes a housing 84 for enclosing the different components associated with the unit 32 and a wrist strap 86 so that the gaming official can easily carry and hold the unit 32. The tuned port 80 is a molded cavity within the housing 84.

The ball marking unit 32 is powered by a rechargeable battery pack 88. Power is applied from the battery pack 88 to a signal generator 90 which is coupled to an ultrasonic transducer 92. The ultrasonic transducer 92 is coupled to the air through the tuned port 80. The tuned port 80 increases the coupling efficiency to the air at the desirable height 82 in order to increase the reliability of transmitting and receiving the ultrasonic signal $f_1$. The battery pack 88 additionally applies power to an on-channel radio frequency transmitter 94 and a modulator heterodyne 96. The modulator heterodyne 96 includes a first button switch 98 and a second button switch 100 such that the gaming official will press one of the two buttons to transmit an RF signal indicating toward which goal the game is being played. Depending on which of two button switches 98 or 100 is pressed, one of two tones will be placed on a carrier wave generated in the transmitter 94 and will be transmitted through an antenna 102 embedded in the housing 84. Additionally, if switch 99 is activated, a third signal will be transmitted via modulator heterodyne unit 96 and antenna 102 for receipt by signal processing unit 34 as an indication that unit 32 is being operated in a RELOCATE OR REPOSITION mode.

In a football game application, the RELOCATE mode would be used by the official to reset the ball at its location on a previous down, for example, after an incomplete forward pass or in preparation for adding penalty yardage from the previous position of the ball. In the RELOCATE mode the official would move unit 32 along the field and wait for the in position light (IPD) 97 to visually indicate the previous position has been attained. The official knows which direction in which to move unit 32 by observing the left and right arrow lamps 93 and 95. The left, right and in-position lamps are activated by signals transmitted by signal processing unit 34 (FIG. 2) and received at unit 32 via antenna 91 and demodulator unit 89. Alternatively, audible indications could be given to the user of unit 32. In the normal, non-relocate mode, the IPD lamp or audible signal is also used to indicate to unit 32 from CPU 36 that the calculation of a new ball position is complete.

The RELOCATE mode could find non-gaming object location applications. For example, in underwater salvage operations, one could accurately return to the last inspected search location after an interruption in salvage or search activity.

Now turning to FIG. 4, a discussion of one of the sensor modules 26 will be given. It will be understood that both of the other sensor modules 28 and 30 will be identical to the sensor module 26 of FIG. 4, and therefore will not be discussed. The sensor module 26 includes a housing 112 which is buried in the ground relative to the side line 14 of the playing field 10 such that a portion 106 of the housing 112 extends a predetermined distance above the ground. Molded as part of the housing 112 within the portion 106 is a tuned port 108. The module sensor 26 includes a transducer, such as a microphone, element 110 acoustically connected to the tuned port 108. The microphone element 110 converts the acoustical energy received by the port 108 to electrical energy variable at an ultrasonic rate. This electrical signal is then applied to a band-pass amplifier 114 to achieve greater selectivity and generate enough energy to drive the coaxial cable 44. The band pass filter 114 is powered by a DC signal coming through the cable 44 from the signal processing unit 34.

Now turning to FIG. 5, a discussion of the calibration source 24 will be given. As is apparent, the calibration source 24 is substantially identical to the sensor module 26 in appearance. In this regard, the calibration module 24 includes a housing 124 embedded in the ground relative to the side line 12 of the playing field 10 such that a portion 120 of the housing 124 extends above the ground so that a tuned ultrasonic port 122 is positioned the distance 82 above the ground. As above, the tuned port 122 is molded as part of the housing 124. Additionally, the tuned port 122 is acoustically connected to a transducer 126. The transducer 126 is electrically connected to signal generator 128 for generating an electrical driving signal to transducer 126 which, in turn, generates the acoustic signal. The signal generator 128 receives power from a rechargeable battery pack 130 and also a signal from a receiver 132. The receiver 132 generates the shut-off signal to generator 128 when an antenna 134 receives the radio frequency $f_2$ from the ball marking unit 32. Additionally, a shut-off switch (not shown) can be incorporated to turn the calibration source 24 off when the ball locating system is not in operation.

Now turning to FIG. 6(a), a ball locating system 160, according to a second preferred embodiment of the present invention, is shown in a schematic block diagram. In this embodiment, only radio frequency signals will be utilized as the transmission between a ball marking unit (not shown) and the different receivers positioned relative to the playing field 10. Because RF signals are used, the environment does not play a factor in transmission, and therefore, a calibration source is not required. For simplicity, the ball marking unit and the receivers can be configured in the same positions relative to the playing field 10 as discussed above for the ball marking unit 34 and the sensor modules 26, 28 and 30. Further, because the ball marking unit associated with this embodiment is a simple RF transmitter, well known to those skilled in the art, it need not be depicted. Likewise, since each of the receivers in this embodiment are simple RF receivers which convert RF energy into proportionate electrical signals, these receivers are also well known in the art, and therefore, will not be elaborated on in any further detail.

The system 160 includes a first receiver 162 and an associated RF antenna 164, a second receiver 166 and an associated RF antenna 168, a third receiver 170 and an associated RF antenna 172, a fourth receiver 174 and an associated RF antenna 176, and a fifth receiver 178 and an associated RF antenna 180. Turning to FIG. 6(b), one possible configuration of the receivers 162, 166, 170, 174 and 178 is shown relative to each other. It is noted, however, with the RF embodiment, the configuration of the receivers 162, 166, 170, 174 and 178 relative to the playing field 10 can be arbitrary. The configuration of the receivers relative to each other should, however, be arranged such that there is a horizontal configuration of the receivers 162, 166 and 170 and a vertical configuration of the receivers 166, 174 and 178. The dashed line represents an arbitrary zero. In this manner, the receiver 166 acts as a reference receiver for the horizontal configuration and the receiver 174 acts as a reference receiver for the vertical configuration. All of the horizontal signals are processed relative to a signal received first at the receiver 166, and all of the vertical signals are processed relative to a signal received first at the receiver 174. Although the system 160 can be used in a variety of object locating systems, it is stressed that for a football locating application, only the receivers 162, 166 and 170 are required as with the first embodiment above.

Returning to FIG. 6(a), the signals received by each of the antennas 164, 168, 172, 176 and 180 are processed by the associated receivers 162, 166, 170, 174 and 178 to produce a clipped, hard-limited square wave having frequency $f_1$. The output signal from the reference receiver 166 is separated and applied to a first coarse programmable delay circuit 182 and a second coarse programmable delay circuit 184. The programmable delay circuits 182 and 184 provide a coarse delay used in determining the delay times of received signals. The signals from the programmable delay circuits 182 and 184 are then applied to first and second fine programmable delay circuits 186 and 188, as shown. If smaller time delay measurements are desired, then additional delay circuits can be cascaded to further increase the delay resolution. The outputs from the fine programmable delay circuits 186 and 188 are applied to threshold logic circuits 190 and 192, respectively. Additionally, the signal from the sensor 162 is applied to the threshold logic circuit 190, and the signal from the sensor 170 is applied to the threshold logic circuit 192. The output from each of the threshold logic circuits 190 and 192 is applied to inhibit further incrementing of the first and second programmable delay circuits 182, 186 and 184, 188, respectively. Delay times from the delay circuits 182, 186 and 184, 188 are then applied to a CPU (not shown) for comparison as will be discussed in greater detail below. The programmable circuits 182–186 are commercially available microcomputer controlled devices well understood to those skilled in the art. Circuits 182–186 could, for example, comprise type AD9500 available from Analog Devices.

Threshold logic elements 190, 192, 202 and 204 are circuits which respond quickly to inputs of very short duration pulses of varying phase. The desired output of the threshold logic element is activated only when the two inputs thereto are substantially exactly in phase. Each threshold logic element 190, 192, 202 and 204 could, for example, be comprised of three commercially available ultra fast operational amplifiers configured as shown in FIG. 6c. One such suitable device for each operational amplifier is the LH0032 from National Semiconductor. Threshold logic element 190 of FIG. 6a is set forth in more detail in FIG. 6c. Inputs 191 and 193 and output 195 are shown in both FIGS. 6a and 6c.

As mentioned above for the ultrasonic embodiment, the signal processed by the reference receiver 166 is always physically received prior to the signals received at receivers 162 and 170. This signal is processed through the programmable delay circuits 182–188 in order to delay the pulsed signal a complementary time so as to coincide with the signals received at the other two receiver modules 162 and 170. As long as the operating signal frequency is lower than approximately 3.0 MHz, the leading edge of one cycle will not overlap the leading edge of the next cycle in the worst-case transit time, thus eliminating the possibility of aliasing. The programmable delay circuits 182 and 186 provide a high resolution in incremental steps of delay for the pulsed signal received at their inputs. The output from the fine programmable delay circuit 186 is applied to the threshold logic circuit 190 along with the signal from the receiver 162 for comparison of the two signals. When the signal from the receiver 166 has been delayed enough so that the two signals from receivers 162 and 166 coincide, the signal at the output of the threshold logic circuit 190 applied to the fine programmable delay circuits 182, 186 will indicate that this event has occurred, and the delay circuit will output a delay signal indicative of the delay. The delay time between the signals of receivers 162 and 166 is immediately determined by reading a digital output word of the microprocessor used to program the delay circuits. Additionally, the time delay between the signals of receivers 166 and 170 may be read as a digital output word the microprocessor applied to the programmable delay circuits 184, 188.

The signal from the vertical reference receiver 174 is also applied to a third programmable coarse delay circuit 194 and a fourth programmable coarse delay circuit 196 to provide for vertical delay comparison. The outputs from the programmable delay circuits 194 and 196 are applied to fine programmable delay circuits 198 and 200, respectively. The outputs from the programmable delay circuits 198 and 200 are applied to threshold logic circuits 202 and 204, respectively. Additionally, the signal from the horizontal reference receiver 166 is applied to the threshold logic circuit 202 and the signal from the vertical receiver 178 is applied to the threshold logic circuit 204. The outputs from the threshold logic circuits 202 and 204 are applied to the programmable delay circuits 194, 198 and 196, 200, respectively. In this manner, delay times are generated as the inputs to the delay circuits 194, 198 and 196, 200 for the vertical direction in the same manner as above for the horizontal direction. These delay signals are then applied by the CPU to the programmable delay circuits in the same manner as discussed above. The combination of the vertical and horizontal location provides a method of locating an object in a three-dimensional space.

A discussion of the calculations to be performed, according to a preferred embodiment, in order to attain the acquisition of time delays for determining the position of the gaming ball (or other object) for both embodiments above will now be given. Referring to FIG. 7, the playing field 10 is shown relative to a coordinate axis system. The length of the field is the x-axis and the width of the field is the y-axis, both represented in inches. According to the sensor configuration in FIG. 1, the sensing module 26 will be at the x=0 inch line, the sensing module 28 will be at the x=1800 inch line, and the sensing module 30 will be at the x=3600 inch line. The receivers for the RF embodiment can also take on this configuration. Therefore, the discussion below will be equally relevant to that embodiment and as such sensing modules 26, 28 and 30 will be interchangeable with receivers 162, 166 and 170, respectively.

As mentioned above, the sensing module 28 receives the ultrasonic signal first, and thus, acts as a reference for the delay signals as received and sent by the sensing modules 26 and 30. It has been discovered that the delay time between the reference signal received directly at the sensing module 28 and the signal received at the sensing module 28 via the sensing module 26 can be depicted as an elliptical cylindrical coordinate system with the y-axis centered at the x=900 inch line as represented in FIG. 8(a). Likewise, the delay time between the reference signal received directly at the sensing module 28 and the signal received at the sensing module 28 via the sensing module 30 also can be depicted as a second elliptical cylindrical coordinate system with the y-axis centered at the x=2700 inch line as shown in FIG. 8(b).

Therefore, each delay time can be represented as one of the rays of the elliptic cylindrical coordinate system associated with each of the sensing modules 26 and 30 depending on the location of the ball marking unit 32. Once it is determined which ray of each coordinate system is representative of the delay time, the two rays can be traced out from the horizontal reference axes of the coordinate systems until they converge within a predetermined tolerance. This converging point is the location of the ball marking unit 32. This concept is graphically depicted in FIG. 9. In this figure, U1 and U2 represent variable locations along each ray being traced out. More particularly, U1 represents incremental positions along the particular ray being traced from the coordinate system of the sensing module 26, and U2 represents incremental positions of the ray being traced out from the sensing module 30. U1 and U2 have a value of zero (0) at the sideline 14.

Figure 10B:
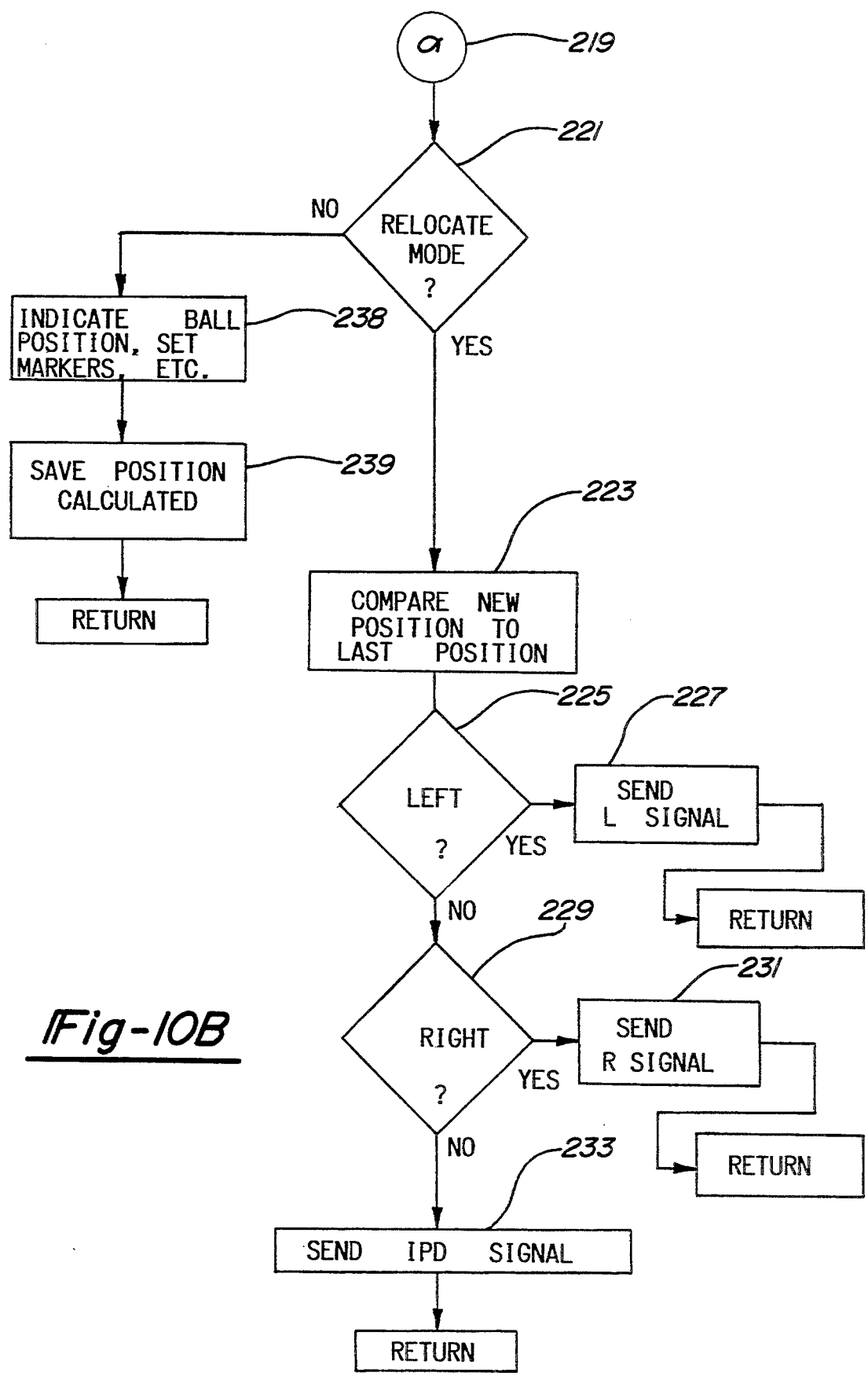
FIG. 10 is a flow chart showing the steps of a ball location process according to one preferred embodiment of the present invention.

With the discussion above concerning ray tracing, the method of actually calculating the gaming ball's position will be given with particular reference to the flow chart as shown in FIGS. 10a and 10b. In FIG. 10a, block 220 represents the continuous calculation of a correction factor provided by the calibration source 24 and as performed by the CPU 36. A correction factor is calculated for each of the different delay times for the sensing modules 26 and 30. More particularly, the correction factor CF1 for the sensing module 26 and the correction factor CF2 for the sensing module 30 are represented by the following equations:

$$CF1 = (\sqrt{LA^2 + WA^2} + 1800 - \sqrt{(1800 - LA)^2 + WA^2})/PC1,$$

$$CF2 = (\sqrt{(3600 - LA)^2 + WA^2} + 1800 - \sqrt{(1800 - LA)^2 + WA^2})/PC2,$$

where LA is the x-axis position of the calibration source 24, WA is the y-axis position of the calibration source 24, PC1 is the measured pulse count between the direct reception of the ultrasonic signal at the sensor module 28 and the ultrasonic signal received at the sensor module 28 via the sensor module 26, and PC2 is the measured pulse count between the direct reception of the ultrasonic signal from the calibration source 24 at the sensor module 28 and the ultrasonic signal received at the sensor module 28 via the sensor module 30. The correction values CF1 and CF2 are given in inches per pulse and are continuously updated when the system is on. Because the RF embodiment does not require calibration, this step is not performed for the RF embodiment.

If the ball marking unit 32 is switched on as represented by decision block 222, the sensing modules 26, 28, and 30 will then receive the ultrasonic signal from the ball marking unit 32. The delay times are measured as values P1 and P2, where P1 is the measured pulse count between the direct reception of the ultrasonic signal from the ball marking unit 32 at the sensor module 28 and reception of the signal at the sensor module 28 via the sensor module 26, and P2 is the measured pulse count between the direct reception of the ultrasonic signal from the ball marking unit 32 at the sensor module 28 and reception of the signal at the sensor module 28 via the sensor module 30. Once the delay times P1 and P2 are calculated, they are corrected (in the ultrasonic embodiment) by multiplying the correction factor CF1 times the delay value P1 and the correction factor CF2 times the delay value P2 in order to get corrected delay values D1 and D2, respectively. This step is represented by box 224. For the RF embodiment, the system does not calculate corrected delay values, but merely uses P1 and P2 (converted to units of length, or in this rf embodiment, inches).

As is known from classical mathematics (see, for example, *Schaum's Outline Series —Mathematical, Handbook of Formulas and Tables*, M. R. Spiegel 1968), in an elliptical cylindrical coordinate system having coordinates u, v, z, the traces of these coordinate surfaces on the xy cartesian coordinate plane are given by $$x = a (\cosh u)(\cos v)$$

$$y = a (\sinh u)(\sin v)$$

where $u \leq o$ and $o \leq v \leq 2\pi$

A parabolic path or ray is defined for each value of v (where v is the angle a tangent to the ray makes with the x axis), and as one proceeds from the x axis (u=o) outwardly along each ray, u increases as a series of ellipses. Therefore, to determine which ray represents a delay time D at starting point u=o in FIGS. 8(a), and 8(bb), a sine and cosine calculation for each of the delay times is performed. This step is represented by block 226. The cosine value CV1 for the coordinate system of the sensing module 26 is given by the equation:

$$CV1 = (D1 - 1800) | 1800.$$

The sine value SV1 for the coordinate system of the sensing module 26 is given by the equation:

$$SV1 = +\sqrt{1 - (CV1)^2}.$$

Likewise, the cosine value CV2 for the coordinate system of the sensing module 30 is given by the equation:

$$CV2 = (1800 - D2) | 1800.$$

And finally, the sine value SV2 for the coordinate system of the sensing module 30 is given by the equation:

$$SV2 = +\sqrt{1 - (CV2)^2}.$$

Once these calculations are made and the specific rays to be traced are distinguished, it is necessary to iteratively proceed along both of the delay rays until they converge within a predetermined tolerance as discussed above with respect to FIG. 9. As represented by the step of block 228, the CPU 36 first initializes U1 and U2 to zero (0) as representative of the values of U1 and U2 at the sideline 14. Next, as represented by the step of block 230, the values of U1 and U2 are incremented a predetermined amount. Once the new values of U1 and U2 are available, values X1, Y1, X2 and Y2 are calculated as possible ball locations along the particular ray for each of the coordinate systems as represented by the following equations: s ps $X1 = 900 \times COSH(U1) \times CV1 + 900,$ $Y1 = 900 \times SINH(U1) \times SV1,$ $X2 = 900 \times COSH(U2) \times CV2 + 2700,$ and $Y2 = 900 \times SINH(U2) \times SV2.$ In other words, (X1, Y1) represents the cartesian coordinate value of U1, and (X2, Y2) represents the cartesian coordinate value of U2. This is represented by the step of block 232. The distance between the two calculated values for the possible ball locations is then determined at block 234 by the following equation:

$$DISTANCE = \sqrt{(X2 - X1)^2 + (Y2 - Y1)^2}.$$

If this distance is within a predetermined tolerance as represented by the step of decision block 236, then the CPU 36 will, at decision block 221 of FIG. 10b, determine whether ball marker unit 32 is in normal or relocate operating mode. If in normal mode, CPU 36 will indicate the position of the ball, set markers, etc., as indicated at block 238. This new ball position is also saved at block 239. When the points $(X_1, Y_1)$ and $(X_2, Y_2)$ are within tolerance, the displayed and stored position can be chosen as either of the cartesian coordinate pairs. Alternatively, and X and Y value could be interpolated from the pairs. Obviously, in the case of football yardage marking, only an X coordinate need be determined. If, however, the distance is not within the predetermined tolerance, the procedure will return to the step 230 of FIG. 10a for incrementing and/or decrementing the values of U1 and U2 by a predetermined amount in order to recalculate their position relative to the rays being traced to find the convergence of the two rays. It has been shown in practice that this method of calculation has an upward maximum value of about 25 steps. In this manner, an accurate location of a gaming ball can be calculated in an effective manner.

Returning to the flow chart of FIG. 10b, if ball marking unit 32 is in the relocate mode, as determined by decision block 221, then CPU 36 compares the just-calculated position with the last previous position at block 223. If the current position of unit 32 is to the left of the last position, as determined at decision block 225, then a LEFT or L signal is forwarded to unit 32. If the current position of unit 32 is to the right of the last position, as determined at decision block 229, then a RIGHT or R signal is forwarded to unit 32. If the old and new positions coincide (within a preselected tolerance), then an in-position-detected, or IPD, signal is forwarded to unit 32. Of course, it will be appreciated that in a football game application, only the X-axis component of the position of unit 32 need be examined at blocks 223, 225 and 229 of FIG. 106. In other two or three dimensional relocate applications, coincidence of all coordinate locations would be required.

Figure 11:
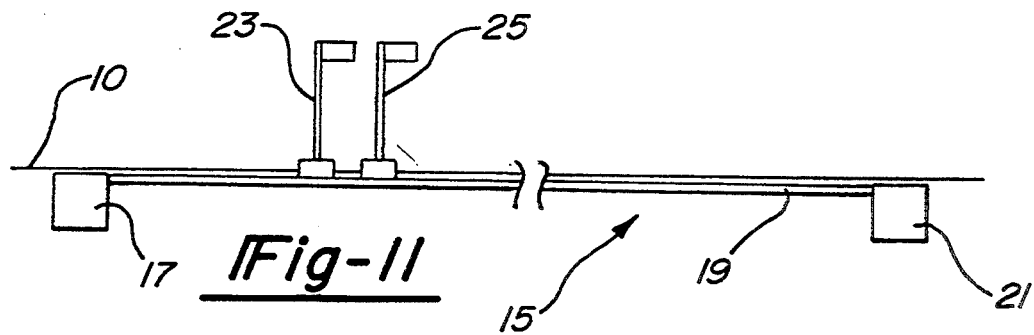
FIG. 11 is a side view of an automatic ball marking system as depicted in FIG. 1.

Now turning to FIG. 11, a side view of the ball marking system 15, discussed above with reference to FIG. 1, is shown. As mentioned above, the ball marking system 15 includes the first control unit 17 at one end of the playing field 16 and the second control unit 21 at an opposite end where a segmented aluminum drive track 19 connects the units 17 and 21. The control units 17 and 21 are operable to position a set of chain drives travelling through the drive track 19 so as to position the ball marker 23 and a first down marker 25 anywhere along the playing field 10 for a visual representation of the football location and the distance to a first down.

Figure 12:
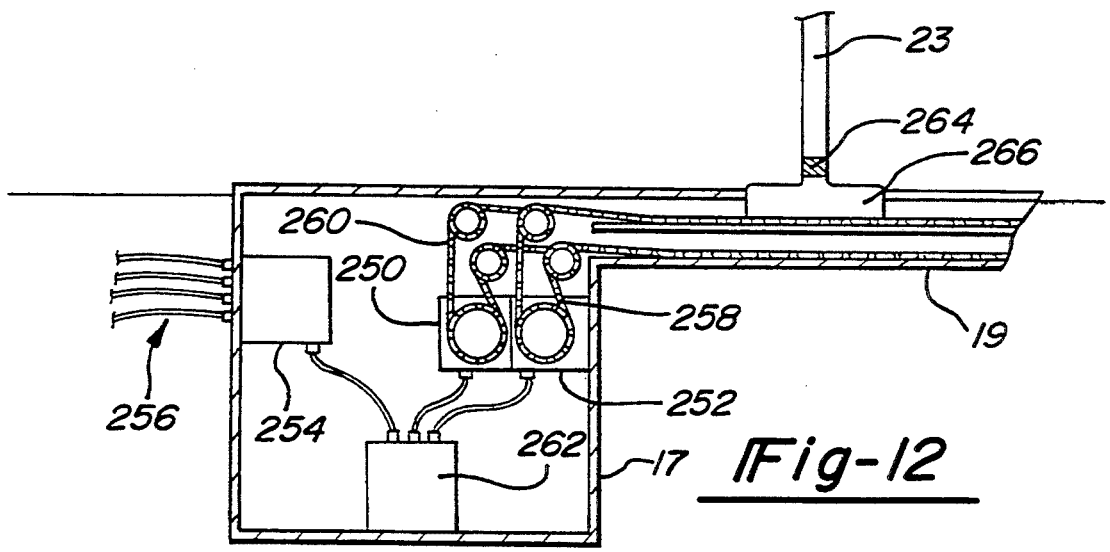
FIG. 12 is a cut-away side view of a portion of the ball marking system of FIG. 11.

FIG. 12 depicts a cut-away side view of the control unit 17 of the system 15. Positioned within the unit 17, in one embodiment, is a processing unit 262, which could be the CPU 36 of FIG. 1, electrically connected to a ball marker drive unit 250 and a first down marker drive unit 252. The processing unit 262 receives its commands from a transducer interface 254 which, in turn, receives its signal from a series of coaxial cables 256 connecting the interface 254 with the sensors depending on the ball locating system used in association with the system 15.

The ball marker drive unit 250 is connected to a first drive chain 258 in order to position the ball marker 23 at any location along the field 10. Additionally, the first down marker drive unit 252 is connected to a second drive chain 260 in order to position the first down marker 25 at any location along the field 10. A series of drive pulleys provide the connection mechanisms between the drive chains and drive units, as shown. When the ball marker drive unit 250 and the first down marker drive unit 252 receive control signals from the processing unit 262, they automatically position the ball marker 23 and the first down marker 25 by means of the drive chain 258 and 260 accordingly. Therefore, once the processing unit processes the delay signals from the sensors it automatically positions the ball and first down markers 23 and 25.

The ball marker 23 is connected to the drive chain 258 by means of a marker support assembly 266, which will be described in greater detail below. Furthermore, a breakaway section 264 is incorporated at the base of the ball marker 23 adjacent the support assembly 266. The breakaway section 264 provides a means by which the ball marker unit 23 will give away in order to avoid personal injury if contacted by a player.

Figure 13:
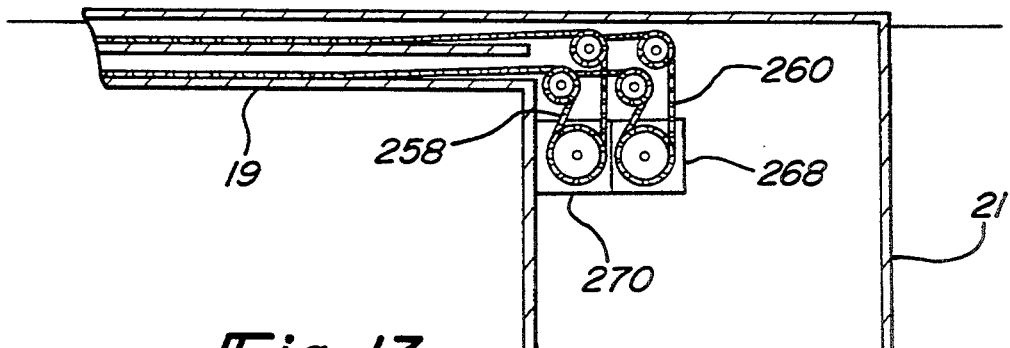
FIG. 13 is a cut-away side view of a second portion of the ball marking system of FIG. 11.

Turning to FIG. 13, the control unit 21 is shown in a cutaway side view. The control unit 21 includes a first chain drive unit 268 for adjusting chain slack and expansion characteristics of the drive chain 260 and a second chain drive unit 270 for adjusting chain slack and expansion characteristics of the drive chain 258. The chain drive units 268 and 270 are commercially available units, such as the DC1 VS product line available from Reliance Electric, or other equivalent unit wherein electronic monitoring of the chain drive motor speed and torque provides feedback information for maintaining consistent control of the drive chain, while preventing chain breakage and enabling exact positioning thereof. The drive chains 258 and 260 are connected to the chain drive units 268 and 270 by means of associated pulleys, as shown. As mentioned above, the segmented aluminum drive track 19 connects the control unit 17 with the control unit 21 along which the drive chains 258 and 260 travel.

Figure 14:
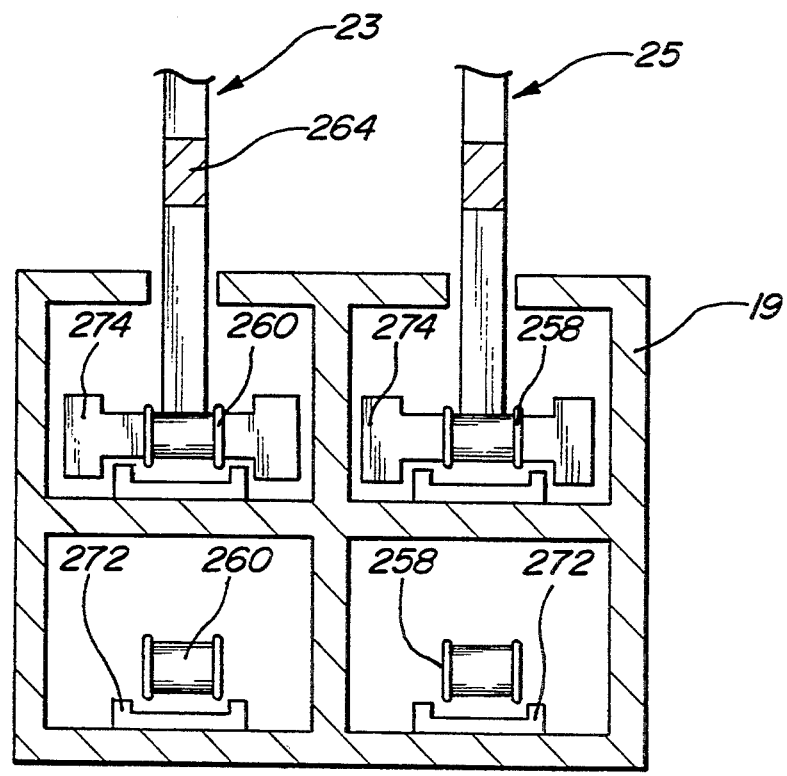
FIG. 14 is a cut-away end view of a third portion of the ball marking system of FIG. 11.

Turning to FIG. 14, a cross-sectional end view of the aluminum drive track 19 is shown. As is apparent, the ball marker 23 and the first down marker 25 are connected to the drive chains 260 and 258, respectively, within the drive track 19. A series of nylon guides 272 enable the drive chains 258 and 260 to travel through the drive track 19 with the appropriate and desirable support with minimization of friction. Additionally, a series of nylon bushing assemblies 274 known to those skilled in the art, are attached to the drive chains 258 and 260 at predetermined locations.

Figure 15:
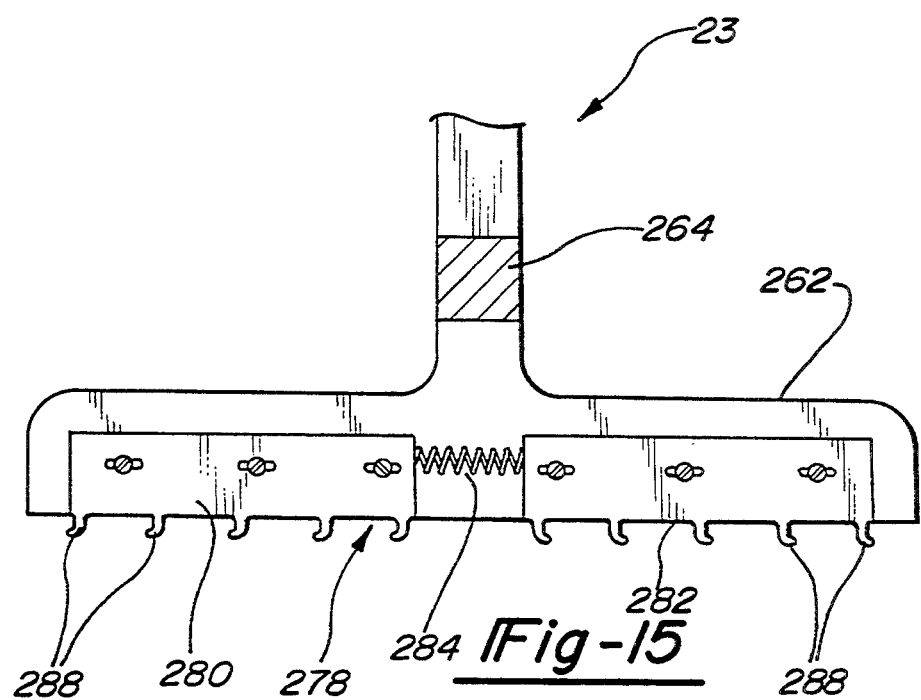
FIG. 15 is a cut-away side view of a ball marker.

FIG. 15 shows a cut-away side view of the ball marker 23. It will be understood that the first down marker 25 is identical, and the discussion below will equally apply to that marker. The ball marker 23 engages the drive chain 260 by means of a spring-loaded locking mechanism 278. The spring-loaded locking mechanism 278 includes a first plate 280 having downward protruding teeth 286 and a second plate 282 also having downward protruding teeth 288. The first and second plates 280 and 282 are connected to each other by means of a spring 284. In this manner, the drive chain 260 can engage with the teeth of the locking plates 280 and 282 in order to move the ball marker unit 23 along the drive track 19.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of determining a position of an object comprising the steps of:
    establishing an object area which is graphically represented by a first cylindrical coordinate system having a first origin and a second cylindrical coordinate system having a second origin;
    positioning a reference receiver at a reference location in the object area, a first additional receiver at a first additional location in the object area and a second additional receiver at a second additional location in the object area;
    transmitting a signal from the object;
    measuring, at a processing unit operable to process siqnals received by the reference receivers, and the first and second additional receivers, a first time delay as a function of the difference between receipt times of the signal received at the reference location and a signal received at the processinq unit via the first additional location;
    measuring, at the processing unit a second time delay as a function of the difference between receipt times of the signal received at the reference location and a signal received at the processinq unit via the second additional location;
    determining which ray of the first cylindrical coordinate system represents the first time delay and which ray of the second cylindrical coordinate system represents the second time delay; and
    determining whether a first position along the ray of the first coordinate system and a second position along the ray of the second coordinate system are located within a predetermined tolerance.

2. The method according to claim 1 wherein the step of determining a first and second position includes the steps of incrementing the first position along the ray of the first coordinate system to establish a new first position, incrementing the second position along the ray of the second coordinate system to establish a new second position, determining whether the new first and second positions are within the predetermined tolerance, and repeating the steps of incrementing and determining the new first and second positions until the new first and second positions are within the predetermined tolerance.

3. The method according to claim 1 further comprising the steps of determining a correction factor and applying the correction factor to the first and second time delays prior to the step of determining the rays of the first and second coordinate systems.

4. The method according to claim 2 further comprising the step of initializing the first and second positions to zero prior to incrementing the first and second positions.

5. The method according to claim 1 wherein the first and second coordinate systems utilize elliptical cylindrical coordinates.

6. The method of claim 1 comprising the further steps of:
    determining whether the object is to be repositioned at a previously determined position;
    whenever the object is not to be repositioned, indicating the position of the object and saving coordinates of the position for future use; and
    whenever the object is to be repositioned, comparing the position just determined with the previously determined position and providing an indication of results of the comparison.

7. A method of determining a position of an object in a space with preselected boundaries comprising the steps of:
    positioning a reference receiver and a plurality of signal receivers in a predetermined pattern within the space;
    transmitting a locating signal from the object for receipt by the reference receiver and by each of the plurality of signal receivers;
    retransmitting the locating signal from each of plurality of signal receivers to a processing unit operable to process locating signals received by the reference receiver and the plurality of signal receivers;
    determining delay times between receipt of the locating signal directly by the reference receiver and receipt of the locating signal by the processing unit by way of each of the plurality of signal receivers; and
    determining the location of the object as a function of the delay times.

8. The method of claim 7 wherein each delay time defines a unique coordinate path in one of a plurality of coordinate systems, each associated with one of the plurality of signal receivers, and wherein the object position is that position defined as where the plurality of coordinate paths converge within a preselected tolerance.

* * * * *